(12) United States Patent
Klein et al.

(10) Patent No.: US 12,187,649 B2
(45) Date of Patent: Jan. 7, 2025

(54) METHOD AND APPARATUS FOR PRODUCING CARBON FOAM BOARDS

(71) Applicant: Nippon Kornmeyer Carbon Group GmbH, Windhagen (DE)

(72) Inventors: David Klein, Hennef (DE); Michael Gerads, Bonn (DE)

(73) Assignee: Nippon Kornmeyer Carbon Group GmbH, Windhagen (DE)

( * ) Notice: Subject to any disclaimer, the term of this patent is extended or adjusted under 35 U.S.C. 154(b) by 0 days.

(21) Appl. No.: 18/421,115

(22) Filed: Jan. 24, 2024

(65) Prior Publication Data

US 2024/0254053 A1    Aug. 1, 2024

(30) Foreign Application Priority Data

Jan. 26, 2023 (WO) ................. PCT/EP2023/051907

(51) Int. Cl.
*C01B 32/21* (2017.01)
*C04B 35/52* (2006.01)
*C04B 111/00* (2006.01)

(52) U.S. Cl.
CPC ............ *C04B 35/522* (2013.01); *C01B 32/21* (2017.08); *C01B 2204/24* (2013.01); *C04B 2111/00224* (2013.01); *C04B 2235/614* (2013.01); *C04B 2235/6581* (2013.01)

(58) Field of Classification Search
CPC .... C04B 35/522; C01B 32/21; C01B 2204/24
See application file for complete search history.

(56) References Cited

U.S. PATENT DOCUMENTS 3,832,426 A * 8/1974 Malthouse .............. C01B 32/00
264/29.4
2022/0410447 A1   12/2022 Cooper et al.

FOREIGN PATENT DOCUMENTS

| CN | 104310373 B |   | 4/2016 |
|----|-------------|---|--------|
| CN | 205797721 U |   | 12/2016 |
| CN | 112898637 A |   | 6/2021 |
| CN | 115058125 A |   | 9/2022 |
| CN | 115448747 A | * | 12/2022 |

(Continued)

OTHER PUBLICATIONS

Fu, Chunfang, Shiyan Guo, Hong Lei, and Jichuan Huo. "From starch to carbonaceous foam: The effects of structure and conformation of the feedstock." Journal of analytical and applied pyrolysis 149 (2020): 104858.

*Primary Examiner* — Farah Taufiq
(74) *Attorney, Agent, or Firm* — Smartpat PLC

(57) ABSTRACT

A method for producing carbon foam boards from starch for use as an insulation material or a filter is disclosed. The method is suitable for producing fine-pored carbon foam boards having a mainly homogeneous structure. This is achieved by sprinkling at least one very thin layer of foamable starch powder onto a temperature-resistant board-like substrate, introducing the starch-powder-coated substrate into a furnace, introducing air, argon or nitrogen into the furnace until an internal pressure of ≈720 mbar to ≈1000 mbar has been established, heating the furnace to a foaming temperature of 180° C.-450° C. to foam the starch powder, maintaining the temperature over a prolonged duration of up to 10 hours to stabilize the foamed starch into a foam board.

11 Claims, 2 Drawing Sheets

(56) References Cited

FOREIGN PATENT DOCUMENTS

| EP | 4108631 A1 | 12/2022 |
|----|------------|---------|
| JP | 2000264991 A | 9/2000 |
| JP | 2003041041 A | 2/2003 |
| JP | 2023004918 A | 1/2023 |

* cited by examiner

METHOD AND APPARATUS FOR PRODUCING CARBON FOAM BOARDS

CROSS-REFERENCE TO RELATED APPLICATION

This application claims the benefit of European Patent Application PCT/EP2023/051907, filed on Jan. 26, 2023, then contents of which is incorporated by reference in its entirety.

BACKGROUND

The disclosure relates to a method for producing carbon foam boards from starch powder or other foamable polymers/polymer mixtures in powder form for use as an insulation material, a filter, or a construction material.

Starch powder generally consists of different polymers and proteins or polymer mixtures such as maize starch or other vegetable-based polymers. This may also include a starch powder obtained from an oat or cereal product. As a polysaccharide, starch is a natural biopolymer.

SUMMARY

The present disclosure provides a method and an apparatus for producing fine-pored carbon foam boards having a mainly homogeneous structure which ensures uniform foaming of foamable starch powder, polymers or polymer mixtures and functions reliably and without additional steam.

Under certain conditions starch which contains polymers is foamable when heated to a relatively high temperature, the size of the bubbles formed being dependent on the specific temperature. In this procedure, a portion of the polymers is melted and simultaneously a further portion of this or of another polymer is decomposed to form a gas which is essentially trapped in the molten polymer and forms the desired foam as an intermediate product. This foam is brown in color and has a soft consistency.

However, if an excessive temperature or unsuitable environmental conditions are selected, the starch decomposes altogether and no foam is formed, with charred residue pieces being formed in the best case.

The term "thin layer" hereinbelow is to be understood as meaning a coating which completely and uniformly covers a surface of a substrate substantially as a closed layer and in which the individual particles of the starch powder are arranged side by side. Within the thin layer, individual particles of the starch powder have a diameter of 1-100 µm. The thin layer has a height corresponding between one and ten times the grain size of the individual starch particles. The thin layer may thus have a height between 1 and 1000 µm.

The method for producing fine-pored carbon foam boards includes the following steps:
   sprinkling at least one very thin layer of foamable starch powder or of another foamable polymer or of a polymer mixture in powder form onto a temperature-resistant boardlike substrate,
      introducing the starch-powder-coated substrate into a furnace,
      introducing argon or nitrogen into the furnace to displace air or by pumping out air from the high-temperature furnace until an internal pressure of 700 to 1000 mbar has been established,
      heating the furnace to a foaming temperature of 180° C. to not more than 450° C. to foam the starch powder on the substrate,
      maintaining the foaming temperature in the furnace over a prolonged duration of up to 10 hours to stabilize the foamed starch into a foam board,
      carbonizing the stabilized foam board at >1000° C. in a suitable furnace in the absence of air in an argon or nitrogen atmosphere.

The foam board carbonized in the furnace may subsequently be graphitized in the same furnace at a temperature >2000° C. under shielding gas or in a vacuum, wherein the furnace may be a vacuum high-temperature furnace.

The foamable starch employed may preferably be pulverulent maize starch, because this is particularly readily and uniformly foamable. It is alternatively also possible to employ a different polymer or a polymer mixture in powder form for foaming, such as tapioca starch, wheat starch or the like.

The heating to the foaming temperature is preferably effected with a heating ramp of ≈5° C./min, that is between 3° C./min and 10° C./min.

The boardlike substrate may be made of a graphitizable material which shrinks with the foam board to the same extent during carbonization and optionally graphitization.

The boardlike substrate may alternatively be made of steel, graphite or another temperature-resistant material, wherein the stabilized foam board must be detached from the boardlike substrate before carbonization.

The foamable starch powder is sieved before or during the sprinkling onto the boardlike substrate to ensure that the sprinkled-on layer has a uniform particle size.

To produce thicker foam boards, after each foaming or stabilizing a further thin layer of starch powder is sprinkled onto the already present foamed layer and foaming is repeated.

It is in principle also possible to slightly reduce the foaming temperature but allow foaming of the starch over a prolonged duration, such that a thinner but harder foam layer can be formed.

If the foaming is to be carried out in air, the foaming temperature should be not more than 250° C.

A structured surface of the foam board is achievable by applying the starch powder to the boardlike substrate or to a previously foamed foam board in locally varying layer thicknesses.

In the case of thicker applied layers of starch powder, it is advantageous and necessary to reduce the foaming temperature of 180° C. by about 10% but, to compensate, the time for which the foaming temperature is kept constant must be extended to facilitate the diffusion of the gases formed during foaming out of the thicker layer and to achieve uniform foaming. It is alternatively also possible to carry out regular sprinkling of "fresh" starch onto the foamed starch. Generally, the foaming temperature depends on a thickness of the layer of foamable starch powder.

To seal the surface, the starch powder sprinkled onto the boardlike substrate may be covered with a pulverulent polymer.

The temperature-resistant boardlike substrate may be made of a graphitizable material, such as a polymer, or else of steel, graphite or a material which is sufficiently temperature-resistant, i.e. up to >250° C. In the latter case, the stabilized foam board must be removed from the boardlike substrate before graphitization.

If a graphitizable material is used as the boardlike substrate, this may be graphitized together with the foam superstrate. A suitable graphitizable material is paper.

To summarize, the method for producing carbon foam boards comprises the following steps:

Sprinkling starch/a polymer or a polymer mixture onto a substrate.

Introducing the coated substrate into a furnace and increasing the temperature to a foaming temperature of 180° C. to 450° C.

Foaming is carried out in air or under an argon or nitrogen atmosphere.

Foaming is carried out at an internal pressure in the furnace between 700 mbar to 1000 mbar.

The foaming temperature affects the density of the foam board, i.e. the denser the foam, the harder, but less insulating, the foam.

Repeating the steps to produce a thicker foam board.

The foam board thus produced is brownish in color.

The apparatus for performing the method is composed of an argon- or nitrogen-filled space or a box in which a furnace having a heating zone for receiving the starch-powder-coated boardlike substrate is arranged.

The furnace may for example be a conveyor furnace provided with a conveyor for transporting the starch-powder-coated substrates from a feeding position into the heating zone and from the heating zone out into a discharging position, wherein the feeding position and the discharging position may also be in the same place or next to one another in space.

The furnace should be able to operate at a temperature of 450° C. and a subatmospheric pressure in the range from 700 mbar to 1000 mbar.

The conveyor is preferably a high-temperature-resistant conveyor belt.

Additionally arranged above the feeding position coupled to a shaker apparatus is a container which contains the starch powder to be sprinkled onto the substrate.

The container is further provided with a sieving apparatus to ensure a uniform particle size of the starch powder to be sprinkled onto the substrate.

In an alternative, provided to produce carbon foam boards from starch powder or other foamable polymers/polymer mixtures in powder form is a heatable vacuum high-temperature furnace provided with an evacuable thermally insulated housing fitted with a gas inlet for inert gas which projects laterally into the housing, wherein the gas inlet is simultaneously coupled to a supplying means for starch powder and wherein a receptacle for layerwise deposition of starch powder is arranged in the housing below the gas inlet.

The starch powder supplied into the gas inlet via the supplying means for starch powder is entrained into the housing by the gas flow and deposited on the receptacle and is foamed by increasing the temperature to the foaming temperature while simultaneously reducing the pressure in the housing. A further layer of starch powder may subsequently be deposited and the foaming repeated until a sandwich structure having the desired layer thickness is formed.

In order to allow precise metering of the supply of starch powder, the supplying means consists of a reservoir container connected to an angled tube arranged therebelow which terminates in the side wall of the gas inlet. The angled tube further has arranged in it a conveying screw as a metering aid and feeding apparatus for the starch to be deposited on the receptacle in the housing.

The gas flow in the gas inlet is utilized to entrain the starch powder which reaches the gas inlet and to deposit it on the receptacle by "dusting".

After achieving the desired layer thickness of the sandwich structure, the gas inlet is stopped and the vacuum high-temperature furnace is heated to 1000° C. or 2000° C. for carbonization/graphitization of the sandwich structure.

BRIEF DESCRIPTION OF THE DRAWINGS

The invention is further explained below with reference to a working example.

DETAILED DESCRIPTION

Figure 1:
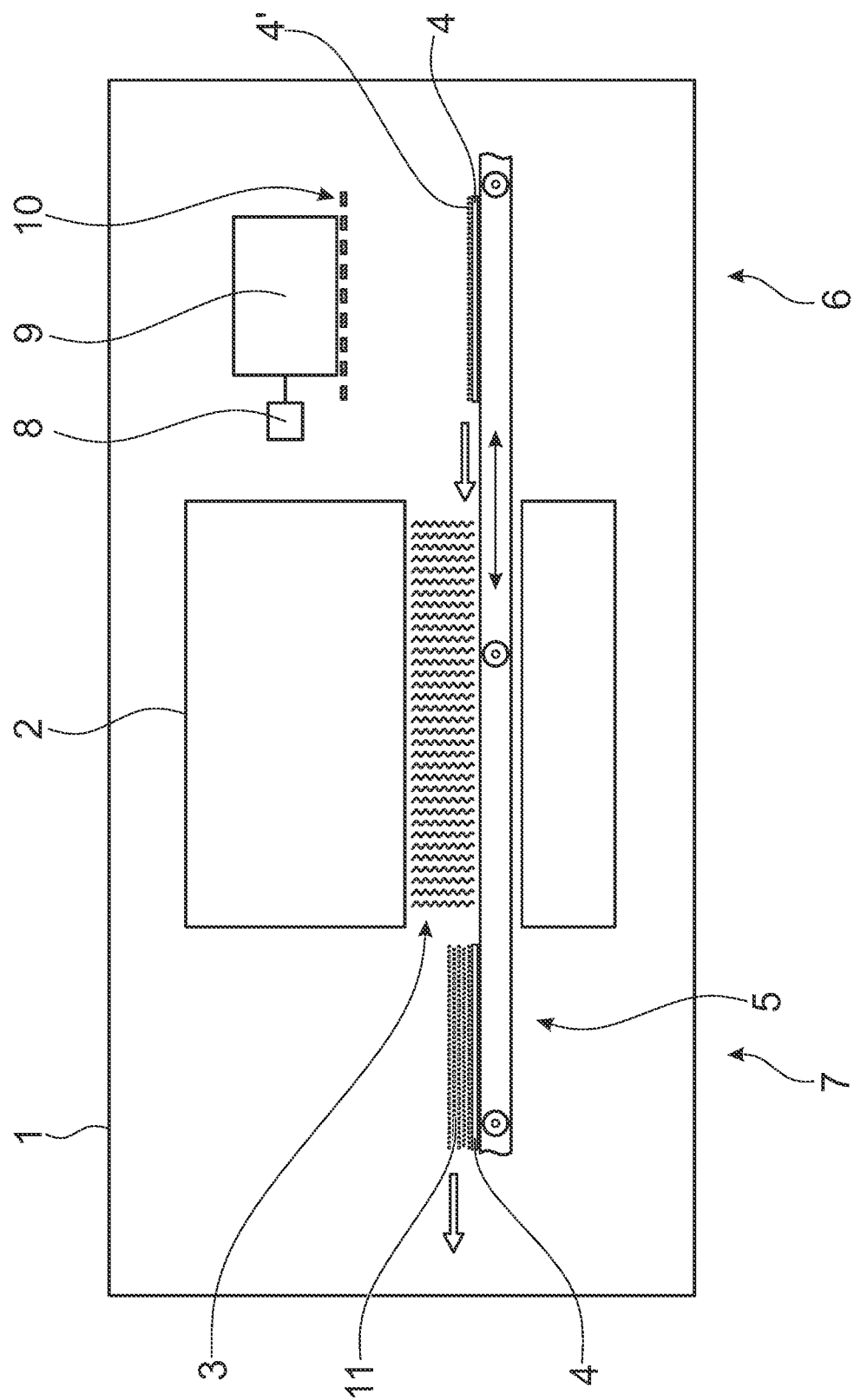
FIG. 1 shows a schematic representation of a conveyor furnace suitable for performing the method.

The apparatus for performing the method is composed according to FIG. 1 of an argon- or nitrogen-filled box 1 comprising a furnace 2 having a heating zone 3 for receiving boardlike substrates 4 coated with starch powder 4'.

The furnace 2 may for example be a conveyor furnace evacuable via the box 1 and provided with a conveyor in the form of a temperature-resistant conveyor belt 5 or the like for transporting the starch-powder-coated boardlike substrates 4 from a feeding position 6 into the heating zone 3 (foaming zone) and from said heating zone out into a discharging position 7, wherein the feeding position 6 and the discharging position 7 may also be in the same place or next to one another in space.

Additionally arranged above the feeding position 6 coupled to a shaker apparatus 8 is a container 9 containing the starch powder to be sprinkled onto the boardlike substrate 4.

The container 9 is further provided with a sieving apparatus 10 to ensure that only starch powder of uniform particle size is sprinkled onto the boardlike substrate 4 as a precondition for uniform foaming in the heating zone 3. It is in principle also possible instead of starch powder to employ starch in granulate form, i.e. with a somewhat coarser particle size than powder.

Instead of the starch powder, it is also possible to employ other polymers/polymer mixtures if they melt at a relatively high temperature and simultaneously liberate a gas.

In summary, the furnace 2 should have the following properties:

A subatmospheric pressure must be producible in the box 1 and thus also in the furnace 2 via a suction means, the furnace 2 remaining open.

The furnace 2 in the box 1 should be operable with different gases that are provided by the box 1.

The box 1 should be filled with argon, nitrogen and be fillable/purgeable with air.

The furnace 2 should be able to reach an internal temperature of 450° C.

The box 1/the furnace 2 should be provided with an offgas system to prevent combustion of the gases formed in the furnace in air.

To produce fine-pored carbon foam boards 11, in a first step at least one thin layer of foamable starch powder or of another foamable polymer or of a polymer mixture in powder form is sprinkled onto a temperature-resistant boardlike substrate 4. This is preferably carried out in the feeding position 7 within the box 1.

The starch-powder-coated boardlike substrate 4 is then transported into the furnace 2 using the conveyor belt 5. Subsequently, air, argon or nitrogen is introduced into the furnace 2 until an internal pressure of 720 mbar has been established in the furnace by displacement of air or by pumping out air from the high-temperature furnace. It is essential here that an internal pressure of 720 mbar to 1000 mbar must be able to be established in the furnace 2.

It is essential that the furnace 2 arranged in the box 1 is always open/employed without a door so that the required internal pressure in the furnace 2 may be adjusted via the box 1, wherein the required gases are also introduced into the furnace 2 via the box 1. This ensures that there is no time loss for controlling gas and pressure, thus allowing for more efficient operation.

The furnace 2 is then heated to 180° C.-450° C. (foaming temperature) in the heating zone 3 to effect foaming of the starch. If air is introduced into the furnace 2 instead of argon or nitrogen, a foaming temperature of 250° C. must not be exceeded.

Otherwise, the specific foaming temperature to be selected depends on the internal pressure, the type of gas, the polymer to be foamed and the gas flow into the furnace. If, for example, the gas flow increases, the foaming temperature must be increased on account of the greater cooling effect.

To effect stabilization of the starch foamed on the substrate 4 to afford a foam board 11, the foaming temperature in the heating zone 3 of the furnace 2 must be maintained over a prolonged duration of up to 10 hours.

To produce thicker foam boards 11, it is sufficient to return the starch-powder-coated boardlike substrate 4 to the feeding position 6 using the conveyor belt 5 to apply a further layer and then to transport it back into the furnace 2. This procedure may simply be repeated until the desired thickness of the foam board 11 has been achieved, with the temperature in the furnace remaining constant.

The foam board 11 which is handleable due to the stabilization is finally carbonized at >1000° C. under vacuum or shielding gas or graphitized at >2000° C. in another furnace. Such a furnace may be a vacuum high-temperature furnace.

If the boardlike substrate 4 is made of a graphitizable material, such as a polymer, e.g. polyacrylonitrile, this may remain joined to the foam board 11 during the carbonization and optionally graphitization. In the simplest case, the boardlike substrate may be made of paper. If the substrate is made of polyacrylonitrile, it may be stabilized.

Alternatively, the boardlike substrate 4 may also be made of graphite or paper-covered graphite or another temperature-resistant material, so that the stabilized foam board 11 may be detached from the boardlike substrate 4 before carbonization since the boardlike substrate 4 in this case does not adhere to the stabilized foam board 11.

The carbonized foam board 11 may also be graphitized in a suitable furnace, e.g. a separate vacuum high-temperature furnace, at a temperature >2000° C.

If thicker foam boards 11 are to be produced, every foaming is followed by sprinkling a further layer of foamable starch powder onto the already present thinner foam board and repeating the foaming until a sandwich structure has been formed.

In this case, the carbonization/graphitization is performable only once foaming is complete for all layers of the sandwich structure.

A structured surface of the foam board 11 is achievable by applying the starch powder to the boardlike substrate 4 in locally varying layer thicknesses.

In the case of thicker applied layers, it is advantageous and necessary to reduce the foaming temperature by up to 10% to facilitate the diffusion of the gases formed during foaming and to achieve a more uniform foaming and to prevent formation of large bubbles. However, the time for which the foaming temperature is kept constant must be correspondingly prolonged. It is alternatively also possible to carry out regular sprinkling of "fresh" starch onto the foamed starch.

It is in principle also possible to perform the entire method "foaming", "carbonizing/graphitizing" in the same furnace, which must then be a sealed vacuum high-temperature furnace in which the temperatures required for the particular method step can be established.

Figure 2:
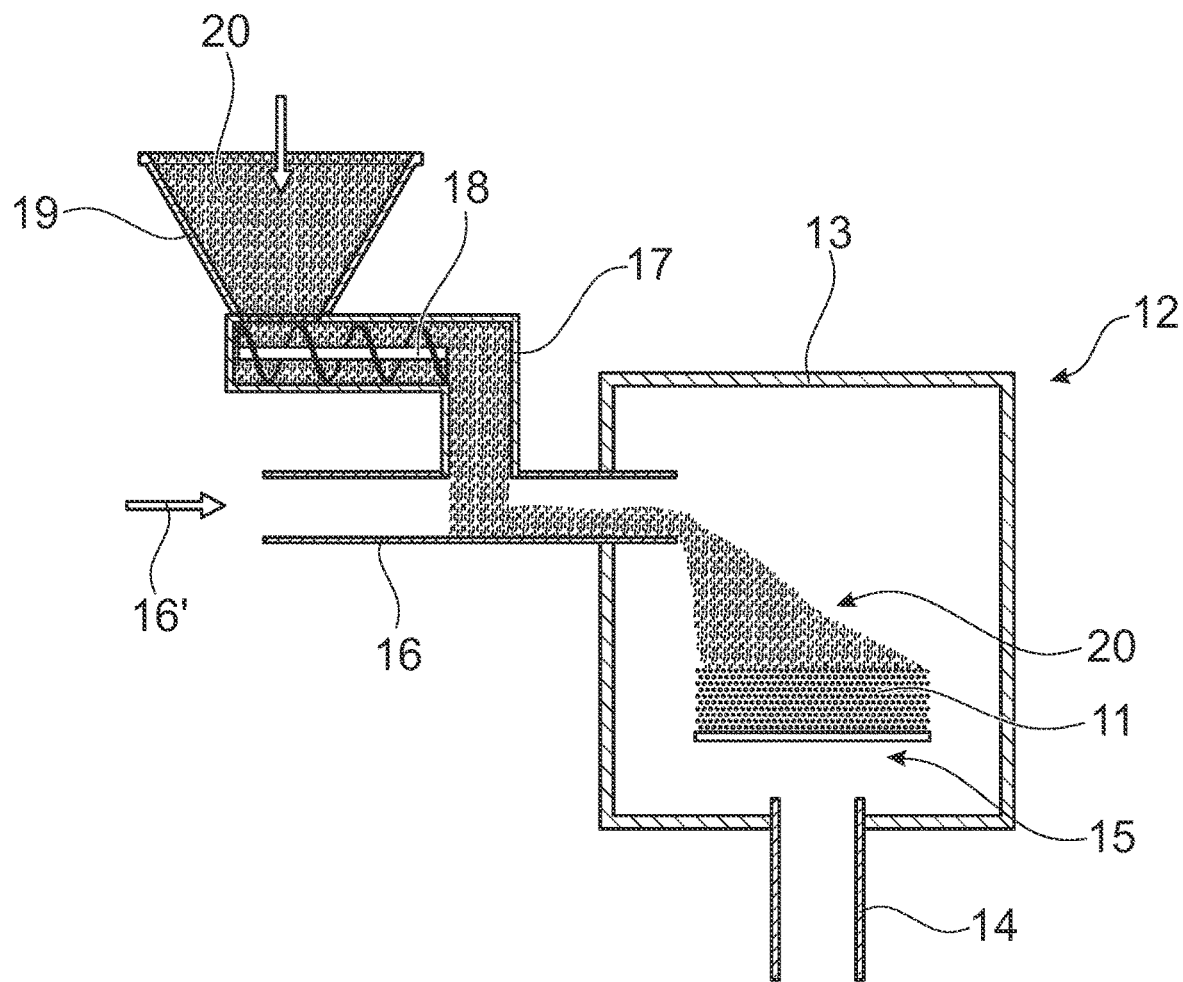
FIG. 2 shows a schematic representation of a vacuum high-temperature furnace suitable for performing the method and for carbonizing and graphitizing.

FIG. 2 shows a schematic representation of a vacuum high-temperature furnace 12 suitable for performing the method for producing carbon foam boards 11 from starch powder or other foamable polymers/polymer mixtures in powder form and also for carbonizing and graphitizing.

The vacuum high-temperature furnace 12 consists of a vacuum-tight housing 13 connected via a connection port 14 to a pump (not shown) for producing a subatmospheric pressure. Further arranged in the vacuum high-temperature furnace 12 is a receptacle 15 for receiving the boardlike substrate 4 for the foam board 11 to be constructed thereupon, for example in the form of a sandwich structure.

Also provided in the upper region to the side in the vacuum high-temperature furnace 12 is a gas inlet 16 which projects into the vacuum high-temperature furnace 12 by a distance above the edge of the receptacle 15.

This gas inlet 16 is connected to a source of inert gas 16' (not shown) and via an angled tube 17 to a conveying screw 18 and a reservoir container 19 for starch 20 arranged thereabove.

The supplying of the pulverulent starch 20 into the high-temperature vacuum furnace 12 is effected using the inert gas flowing into the vacuum high-temperature furnace 12 via the gas inlet 16 which entrains the starch 20 conveyed by the conveying screw 18 from the reservoir container 19 into the angled tube 17 on account of the gas flow through the gas inlet 16 and is deposited on the boardlike substrate 4 arranged on the receptacle 15 in a manner similar to the dusting of substrates and undergoes foaming upon reaching the foaming temperature.

This makes it possible to produce thick foam boards 11. Alternatively, the temperature may also be alternately increased and decreased to obtain layers of greater or lesser density.

It is also possible to produce sandwich structures by initially depositing a layer of starch 20 and subsequently foaming said layer and then depositing and foaming a further layer of starch 20, etc.

Upon reaching the desired layer thickness of the foam board 11 the gas supply may be terminated and the vacuum high-temperature furnace heated up to 1000° C. or 2000° C. for carbonization and graphitization, respectively.

LIST OF REFERENCE NUMERALS

1 Box
2 Furnace
3 Heating zone
4 Boardlike substrate
4' Starch powder
5 Conveyor belt/conveyor
6 Feeding position
7 Discharging position 8 Shaker apparatus
9 Container
10 Sieving apparatus
11 Foam board
12 Vacuum high-temperature furnace
13 Housing
14 Connection port
15 Receptacle
16 Gas inlet
16' Inert gas
17 Angled tube
18 Conveying screw
19 Reservoir container
20 Starch

What is claimed is:

1. A method for producing carbon foam boards, comprising:
    sprinkling a dry layer of foamable starch powder onto a temperature-resistant substrate board to form a starch-powder-coated substrate board;
    introducing the starch-powder-coated substrate board into a furnace;
    introducing argon or nitrogen into the furnace to displace air or pumping out air from the furnace until an internal pressure of 720 to 1000 mbar has been established;
    heating the furnace to a foaming temperature between 180° C. and 450° C. and thereby foaming the starch powder on the starch-powder-coated substrate board; and
    maintaining the foaming temperature over a prolonged duration between 1 and 10 hours to stabilize the foamed starch into a foam board.

2. The method as claimed in claim 1, further comprising: carbonizing the foam board at a temperature >1000° C. or graphitizing the foam board at a temperature >2000° C. under vacuum or shielding gas.

3. The method as claimed in claim 1,
    wherein the foamable starch powder is corn starch, tapioca starch, wheat starch, or starch powder obtained from oats or cereals.

4. The method as claimed in claim 1,
    wherein the heating to the foaming temperature is carried out with a heating ramp between 3 and 10° C./min.

5. The method as claimed in claim 1,
    wherein the substrate board is made of a graphitizable material.

6. The method as claimed in claim 1,
    wherein the substrate board is made of steel or graphite.

7. The method as claimed in claim 1, further comprising sieving the foamable starch powder before or during sprinkling onto a substrate board.

8. The method as claimed in claim 1, further comprising sprinkling, after foaming the starch powder, a further layer of foamable starch onto the foamed foam board, and
    repeating the foaming.

9. The method as claimed in claim 1, further comprising applying the starch powder to the substrate board or to a previously foamed foam board in locally varying layer thicknesses to form a structured surface of the foam board.

10. The method as claimed in claim 1, further comprising selecting the foaming temperature and the prolonged duration based on a thickness of the layer of foamable starch powder.

11. The method as claimed in claim 1,
    wherein the substrate board employed is polyacrylonitrile.

* * * * *